United States Patent [19]
Marshall et al.

[11] Patent Number: 5,887,382
[45] Date of Patent: Mar. 30, 1999

[54] SEED MAT AND PROCESS FOR FORMATION THEREOF

[76] Inventors: J. C. Marshall; J. C. Marshall, II, both of P.O. Box 219, Smelterville, Id. 83868

[21] Appl. No.: 943,045

[22] Filed: Oct. 1, 1997

[51] Int. Cl.⁶ .................................................. A01C 1/04
[52] U.S. Cl. .................................................. 47/56; 47/74
[58] Field of Search ........................ 47/9, 1.01, 56, 47/74; 156/276; 405/16, 21, 19

[56] References Cited

U.S. PATENT DOCUMENTS

| | | | |
|---|---|---|---|
| 4,283,880 | 8/1981 | Fjeidsa | 47/56 |
| 4,309,844 | 1/1982 | King et al. | 47/56 |
| 4,318,248 | 3/1982 | Muldner | 47/56 |
| 4,414,776 | 11/1983 | Ball | 47/56 |
| 4,584,790 | 4/1986 | Gaughen | 47/56 |
| 5,189,833 | 3/1993 | Clark | 47/56 |
| 5,199,215 | 4/1993 | Lopez | 47/56 |
| 5,205,068 | 4/1993 | Solomon | 47/56 |
| 5,224,290 | 7/1993 | Molnar et al. | 47/56 |
| 5,226,255 | 7/1993 | Robertson | 47/56 |
| 5,358,356 | 10/1994 | Romanek et al. | 405/16 |
| 5,417,010 | 5/1995 | Ecer | 47/56 |
| 5,555,674 | 9/1996 | Molnar et al. | 47/56 |

*Primary Examiner*—Thomas B. Will
*Assistant Examiner*—Robert Pezzuto
*Attorney, Agent, or Firm*—Keith S. Bergman

[57] ABSTRACT

A seed mat provides an optional lower plastic mesh layer overlain by a lower scrim layer overlain by a seed layer optionally containing biodegradable beneficiating additives overlain by a fiber layer optionally overlain by an upper scrim layer with the fiber layer or upper scrim layer, if present, overlain by an upper plastic mesh layer. The mat is formed on a conveyor by 1) creating the fiber layer on the conveyor; 2) creating the upper scrim layer, if optioned, by placing dry cellulosic tissue over the fiber layer, wetting the tissue, applying vacuum beneath the fiber layer to consolidate the tissue on the underlying fiber layer and drying; and 3) extruding an upper plastic mesh layer on the fiber layer or the upper scrim layer if present. The mat then is turned upside down on the conveyor and 4) the seed layer and desired additives are deposited on the then upper surface of the fourth fiber mat layer; 5) the lower scrim layer of dry cellulosic tissue is placed in the same manner as the upper scrim layer; 6) the lower plastic net layer, if optioned, is extruded on the surface of the scrim layer; and 7) the finished mat is removed.

11 Claims, 2 Drawing Sheets

SEED MAT AND PROCESS FOR FORMATION THEREOF

BACKGROUND OF INVENTION

1. Related Applications

There are no applications related hereto heretofore filed in this or any foreign country.

2. Field of Invention

This invention relates generally to multilayered seed mats having reinforcing mesh layers formed by plastic extruded in place on the mat and thin biodegradable scrim layers consolidated in place on the mat.

BACKGROUND AND DESCRIPTION OF PRIOR ART

The use of mats to establish and nurture the growth of various vegetative material in the earth has been long known, but only recently has the process become widely used, especially for the establishment of grass turf.

The use of seed mats for establishing vegetation provides various advantages over direct seeding in the earth. Seed mats provide a flexible blanket-like structure that may have substantial physical strength to aid in maintaining its structural integrity during initial placement, germination and early plant nurture, which aids positional maintenance of the mats on the earth and prevents, or at least lessens, erosion of earth beneath the mats that is susceptible thereto by reason of typography or preparation for establishment of a seed bed.

The placement of materials required to establish a seed bed by use of seed mats is often simpler, less time consuming and more effective than direct placement in the earth, especially in typographically adverse areas. Seed and materials having beneficiating biological action may be uniformly distributed in the mats during manufacture, whereas if these materials are independently applied to the earth under field conditions, this may not be, and commonly is not, the case. The seed mat provides fibrous matter that often creates a more friendly environment for seed germination and the establishment of young seedlings than does the earth itself, especially for maintaining moisture. Seed mats also may contain various seed and plant beneficiating materials such as germination enhancers, hormones, fertilizers, moisture retention agents and the like, all of which may be established by the mat placement process. Though seed mats have had a substantial history and a lengthy developmental period, and through that period have become increasingly sophisticated, problems still remain with the mats, their manufacture and use. The instant invention solves various of these remaining problems.

Commonly the creation of a turf by use of seed mats has been more expensive than the creation of the same turf by traditional direct seeding in the earth, and notwithstanding additional benefits offered by seed mats, this higher cost has often prevented seed mat use. The instant mat uses materials and allows assemblage of those materials in a particular manufacturing process that provides a seed mat of generally higher quality, but yet of lower cost than prior mats. This superior structure and lower cost is accomplished primarily by forming relatively thin scrim layers of cellulosic fiber tissue on the lower and optionally the upper surfaces of the mat and by forming reinforcing netting of polymeric or resinous plastic materials, usually of a biodegradable nature, in place directly upon the mat during the manufacturing process.

Most seed mats provide a fiber layer of moisture absorbative and retentent material in the mat structure on one or both sides of a seed layer. The material commonly comprises vegetative fiber loosely consolidated, somewhat stratified and felted in nature with little, if any, vertical entanglement of the fibers. This type of fibrous mat makes it difficult during the manufacturing process to place seed and particulate beneficiating material in a homogeneous distribution. Commonly seed layers in prior mats, even if homogeneous at the time of their creation, tended to allow redistribution of seeds and particulate material in a non-homogeneous fashion in the period after manufacture by reason of normal handling, transport and placement. In the past, this problem has been somewhat addressed by needling a fibrous mat after association of a seed layer with it to provide more vertical entanglement of fibers, but this procedure generally has not been particularly effective in accomplishing its desired ends and has added the problem of cracking, breaking or shattering seeds during the needling process to lessen seed germination and overall viability. The instant seed mat solves this problem by providing a fibrous mat with a seed layer on a surface that immediately after placement is covered with a relatively thin scrim tissue layer formed of easily degradable cellulosic fiber, somewhat similar to ordinary toilet tissue. This scrim tissue layer is preformed and placed in a dry state to allow handling, but immediately wetted and consolidated by vacuum on the adjacent seed layer and fibrous mat surface beneath the seed layer, with or without added adhesives, sealants and the like to further bond the seed layer on the adjacent mat surface.

This scrim tissue layer by its nature, and as aided by the use of additives in the wetting process, also may serve as a moisture barrier to lessen the transfer of water from the seed mat and maintain the mat in a moist condition for longer periods of time than otherwise would result without use of the scrim tissue layer.

Most seed mats provide some type of reinforcing material, often of a net-like nature, to aid in maintaining their configurational integrity to prevent erosion and aid positional maintenance of the mat prior to the establishment of a plant bed. Normally it is desirable that this reinforcing material be of a biodegradable nature so that it maintains its integrity during plant establishment, but after such establishment the material will disintegrate by reason of natural environmental conditions so that it will not have to be physically removed to allow turf maintenance. Such reinforcing nets heretofore have been preformed prior to seed mat manufacturing and incorporated in their manufactured form in a seed mat. Some such mats heretofore used have not been biodegradable but have had to be physically removed from a plant bed after establishment so that they would not interfere with plant maintenance and the equipment used therefore. The formation of the instant mat is materially aided by the development of modern biodegradable plastics that are of a settable nature to allow formation of reinforcing netting by extrusion directly on the mat materials during the manufacturing process. This netting is formed by one or preferably two or more linear extrusion heads, with multiple spaced extrusion orifices, and at least one extrusion head movable relative to the other and transversely to a mat moving therebeneath to create various net patterns. Netting established in seed mats in this fashion allows wide variation in filament size, patternation, strength, durability and biodegradability to allow various mat designs to fulfill most desired purposes.

Normally it is desired that at least one reinforcing net layer of a seed mat be located on the upper surface of the mat when placed, but yet when a net is formed by extruding settable plastic, the extrusion process ordinarily must be carried out from above the upper surface of the mat to obtain the benefits of gravity aided placement. Generally layers of seed, additive particulate matter and cellulosic fiber must also be placed from above the mat in a particular order. To allow such a formation process, we form the fiber layer on a conveyor and extrude a netting layer on the upper surface of the fiber layer. A cellulosic tissue layer is then established over the netting layer, if desired, and the mat is thereupon turned upside down on the conveyor so that the seed layer then may be placed on the then upper surface of the mat, which ultimately will become its lower surface when applied to the earth, and a bottom cellulosic tissue layer is applied over the seed layer. An optional bottom mesh layer then may be established by extrusion onto the bottom cellulosic tissue layer, or, if desired, on the fiber layer before placement of the lower or bottom scrim layer. The then upper surface of the mat will be the lowermost surface when the mat is established for use. The finished mat may be rolled with either side outermost to allow most convenient placement upon unrolling.

This method of formation allows a continuous manufacturing process which may form a single width of seed mat or a wide width which may be subsequently slit to create a plurality of mats of a desired lesser width.

Our invention resides not in any one of these features individually, but rather in the synergistic combination of all of the structures and processes of our invention which give rise to the functions necessarily flowing therefrom.

SUMMARY OF INVENTION

Our invention provides a layered seed mat and method for forming it. The mat has a lower cellulosic scrim layer supporting a seed layer with a fiber layer thereabove carrying a reinforcing mesh layer on its upper surface. Optionally, the upper surface of the mat between the fiber and upper mesh layers or above the upper mesh layer may carry an upper cellulosic scrim layer, and the lower surface of the mat may carry an additional mesh layer beneath the lower scrim layer. The seed mat may carry various biologically beneficiating materials such as germinating agents, growth hormones, fertilizers, moisture retention agents and the like in an additive layer between scrim and upper mesh layers and especially in the seed layer. Either scrim layer may contain adhesives, sealants and additional biologically beneficiating agents.

The mat is formed by:

1) establishing a fiber layer on a supporting conveyor;

2) extruding a settable plastic mesh on the upper surface of the fiber layer by moving the fiber layer beneath one or more spaced, laterally extending extrusion heads, at least one of which is laterally movable relative to the supporting conveyor;

3) optionally placing a top scrim layer of dry cellulosic tissue over the net layer, wetting the scrim layer with fluid optionally containing adhesives and sealants, consolidating the scrim layer by vacuum onto the surface of the underlying layers and drying the scrim layer;

4) turning the mat upside down on the supporting conveyor;

5) depositing a seed layer on the now upper surface of the fiber layer;

6) optionally creating an additive layer of biologically beneficiating material on or in the seed layer;

7) creating a bottom scrim layer of dry cellulosic tissue on the seed layer and underlying layers, wetting the scrim layer with fluid optionally containing adhesives and sealants, consolidating the scrim layer by vacuum on the underlying layers and drying the scrim layer;

8) optionally extruding a bottom settable plastic mesh on the now uppermost lower scrim layer by moving the mat beneath one or more spaced, transversely extending extrusion heads, at least one of which is laterally movable relative to the supporting conveyor; and 9) removing the completed seed mat.

In providing such product and process, it is:

A principal object to create a multi-layered seed mat having in the placement mode at least a bottom scrim layer, a seed layer thereabove, a fiber layer above the seed layer and a reinforcing mesh layer of settable, biodegradable plastic mesh extruded in place on the fiber layer.

A further object is to provide such a mat that may optionally have a second biodegradable plastic mesh layer extruded in place on either side of the bottom scrim layer and an upper scrim layer on either side of the upper plastic mesh layer.

A still further object is to provide a method of forming such a seed mat by establishing the fiber layer on a moving conveyor, creating the first mesh layer on the upper surface of the fiber layer by extruding settable plastic downwardly through one or more elongate extrusion heads extending laterally across the fiber layer with at least one extrusion head moving in a lateral direction relative to the mat, turning the mat upside down, placing the seed layer on the then upper surface of the fiber layer and placing the scrim layer thereover.

A still further object is to consolidate the scrim layers after placement on supporting layers by wetting the scrim layers with a fluid, optionally containing adhesives and sealants, consolidating the scrim layers on the supporting layers by application of vacuum from the mat surface distal from the wetted scrim layers and subsequently drying the scrim layers.

A still further object is to provide such a seed mat and formation process that are new and novel, of simple and economic design and otherwise well adapted to the uses and purposes for which they are intended.

Other and further objects of our invention will appear from the following specification and accompanying drawings which form a part hereof. In carrying out the objects of our invention, however, it is to be remembered that its accidental features are susceptible of changes in design and arrangement, with only preferred and practical embodiments of the best known modes being illustrated and described, as is required.

BRIEF DESCRIPTION OF DRAWINGS

In the accompanying drawings which form a part hereof and wherein like numbers of reference refer to similar parts throughout.

DESCRIPTION OF PREFERRED EMBODIMENT

Figure 1:
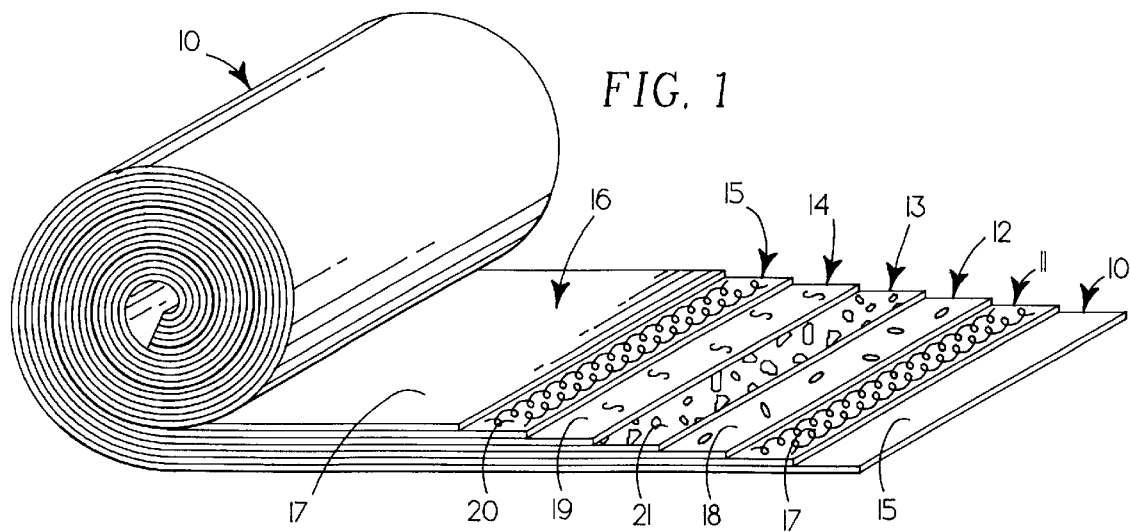
FIG. 1 is a somewhat diagrammatic, partially cut-away isometric view of our seed mat in position for placement, showing its various layers and their relationship.
Figure 3:
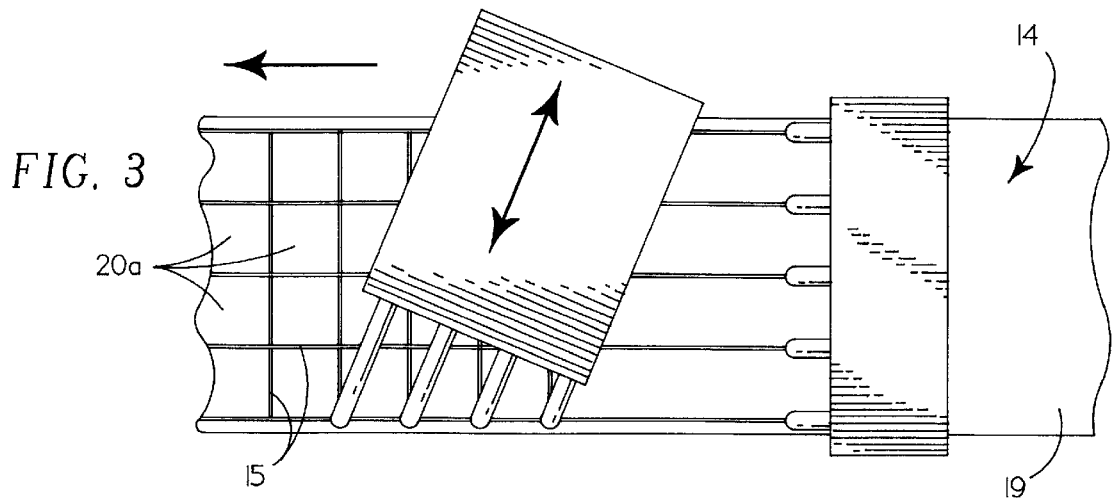
FIG. 3 is a plan view of an arrangement of two extrusion heads for creating a vertically intersecting mesh pattern of extruded plastic filaments.
Figure 4:
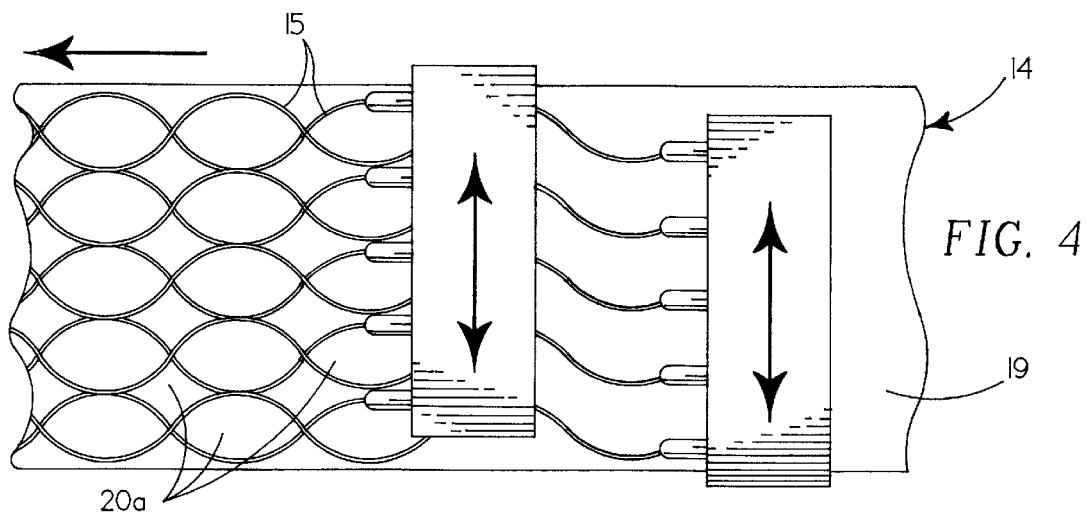
FIG. 4 is a plan view of an arrangement of two spaced extrusion heads that both oscillate laterally relative to the mat to create an interlocking net-like pattern of extruded plastic filaments.

Our seed mat generally comprises bottom scrim layer 11 supporting seed layer 12 with fiber layer 14 thereabove and an upper mesh layer 15 on the upper surface of the fiber layer. Optionally the seed mat may have lowermost bottom mesh layer 10, additive layer 13 of beneficiating biological materials and uppermost scrim layer 16.

Bottom scrim layer 11 is a thin layer of shorter cellulosic fiber 17 loosely consolidated in a fashion similar to and of a thickness approximating biodegradable toilet tissue. The purpose of this layer is to maintain seed layer 12 in place on the surface of fiber layer 14 and prevent migration of seeds and any particulate biological beneficiating material, after placement and during subsequent transport, storage and mat establishment, from being dislodged and moving from original positions to prevent an uneven and irregular seed bed from being formed by the seed mat. The scrim layer 11 must be easily biodegradable because it separates seed layer 12 from the earth in which germinated seeds will ultimately gain residence. The scrim layer cannot be too strong, tough or durable as if it were it may prevent passage of root structure therethrough after seed germination. The scrim layer must also be sufficiently thin and flexible to allow it to come into intimate contact with earth beneath it, as if air or gas filled voids exist between the scrim layer and the earth, these voids tend to allow more rapid moisture removal and create dry areas about adjacent seeds so that the drier seeds may not germinate or if they do germinate may not do so in a proper and timely fashion. Additionally, since seed sprouts upon germination generally direct their body structure along a path of least physical resistance for growth and often are not too gravity sensitive, the sprouts may grow downwardly into a void rather than upwardly according to their normal habit to either destroy or deleteriously effect the sprouting plant structure.

Scrim layer 11 must be positionally maintained on the surface of fiber layer 14 with seeds of seed layer 12 in the interface between the scrim and fiber layers. Traditionally any consolidation and fastening of various layers in seed blankets, and especially the seed and fiber layers, has been accomplished by needling which to some degree damages seeds by cracking, breaking or otherwise disturbing the outer layers of the seeds to prevent or disrupt germination. Needling is not effective to interconnect thin cellulosic tissue layers on fiber material because the needling will not intermix the shorter, finer and more sparse fibers of the cellulosic tissue layer sufficiently with the fibers of the fiber layer to accomplish much, if any, interconnection. We therefore maintain the scrim and fiber layers in adjacency by cohesion and optionally adhesion. Since the cellulosic tissue layer has little wet strength, but rather substantially disintegrates upon being wetted, we place a sheet of cellulosic tissue in a dry state on the fiber mat to allow handling and thereafter apply fluid while the cellulosic layer is supported on the fiber layer. The wet scrim layer then, aided by the application of vacuum, is moved into immediate adjacency with the fiber layer and dried to cause an interconnecting cohesion at and about the interface of the two layers which may be accentuated by adhesives contained in the wetting fluid.

Various soluble adhesives, sealants or similar materials may be used in the scrim wetting fluid so long as these materials are reasonably biodegradable and do not damage seeds, other material in the mat or plant structures associated with the mat. Any adhesives should be such as to lose their adhesive properties quite rapidly upon being rewetted, as if they retain those properties too long after wetting, they may be deleterious to the germination of seeds and establishment of seedlings. The preferred adhesives are of a weak nature such as hydrolyzed starch or dextrin adhesives of a water soluble nature as heretofore commercially known. The nature and amount of such adhesives may be adjusted to accomplish desired variations of their properties through a fairly wide range.

Seed layer 12 may comprise seeds 18 of a wide variety that establish desired vegetation in the earth's surface. Seed mats are particularly well adapted and commonly used to established cover type plantings such as grass turf, though they are not limited to such purposes and may be used for seeding vegetables, flowers and most other seed generated vegetation. Seed mats, largely because of their cost and the labor involved with their use, have not heretofore been particularly adapted to or used in the seeding of field crops, except for grass turf, though their use is progressing in this direction as the seed mat art develops, becomes more sophisticated and provides lower cost products.

The instant seed mat is particularly adapted for establishing grass turf such as about construction sites upon construction completion, in establishing lawns about residential structures, in establishing turf on golf courses, on turf farms and in newly cultivated areas. The seed 18 in such mats may comprise a single species of grass, but commonly comprises a mixture of several species and the seeds may be chosen to satisfy the needs of particular users and environments.

Fiber layer 14 is a felted mat formed of flexible, water absorbent fiber 19. The purpose of this layer is to physically protect seeds, positionally maintain them in substantially the two dimensional array in which they are placed and aid in providing a biologically proper environment in which the seeds may germinate, form seedlings and establish their transition into viable plants. The fiber normally is of a somewhat biodegradable and environmentally friendly nature so that it need not be removed after establishment of a planting, and its degradation products should not harm a plant bed established by the mat and preferably should beneficiate it.

The material of preference for the fiber layer is some reasonably fine cellulosic fiber 19, preferably of a vegetative or an arboreal nature, because of availability and relatively low cost of such materials. Other herbaceous fibers such as cotton lint, the leaf and stem tissue of various cereal grains and grasses and other similar fibers including even artificial fibers are usable in our mat and within its scope. Altered vegetative materials such as peat and moss residue have long been used in seed mats and are usable in the instant mat.

The fiber mat 14 to be effective must be absorbative of sufficient water to maintain a humid environment for the germination of seeds and the nurture of young seedlings. Various additives may be provided in the fiber layer to aid its water absorption and retention. Many of these materials are presently known and used for such purposes, and they vary widely in their water retenting abilities. In general if such materials are used we prefer fiber mats with superabsorbent additives that will absorb approximately two hundred times their weight in water. If the absorption of the additive is substantially greater, such as in the two or three thousand range, the additive itself may keep water from use by seeds and seedlings and if the absorption is much lower than two hundred, the additive does not produce results of maximum efficiency. Some herbal fibers provide adequate absorbency in their natural state, but if additives are required to increase absorbency, we prefer known starch or dextrin based super-absorbents that by their nature and amount maintain absorbency within the general range indicated.

The fiber mat is of a fairly loose nature and low density, but should be sufficiently consolidated that it is reasonably configurationally self-sustaining. The mat generally is formed by entanglement, consolidation and felting of fibers with some subsequent pressure. The consistency of such a mat may be somewhat determined by the degree of entanglement with which the fibers are placed and the pressure, if any, to which they are subjected after placement. Such a mat may be further consolidated by the use of adhesives, by needling before placement of the seed layer or by similar processes known in the mat forming art, but generally neither adhesion nor needling are required.

If a somewhat more interconnected fiber layer is desirable, it may be formed by creating elongate fibers of thermal plastic and intermixing these plastic fibers with the cellulosic fibers forming the mat. Subsequent to placement, the fiber mat is subjected to heat in an oven or otherwise to thermally activate the plastic fibers toward fluidity, or at least plasticity, to cause their interconnection with adjacent cellulosic fibers to create a more interconnected structure. The amount of interconnection of fibers in the mat may be regulated by the proportion of plastic fibers used, the nature of the plastic used and the amount and duration of heating.

Upper mesh layer 15 is provided on the upper surface of fiber layer 14 to strengthen the seed mat sufficiently that once established on the earth's surface and fastened thereto by staples, nails or other fasteners, the mat will be positionally maintained as established to prevent erosion and establish vegetation in the desired place. The mesh layer is formed in place directly on the upper surface of fiber layer 14 by extruding strands of settable plastic 20 in appropriate patternation. This plastic is extruded through a plurality of orifices defined at spaced distances in preferably at least two laterally extending extrusion heads positioned above the mat and spaced from each other in the direction of travel of the mat on a conveyor therebeneath. At least one of the extrusion heads is moved laterally in oscillatory fashion so that various interconnected net type patterns of extruded plastic strands are formed directly upon the fiber layer surface. Various net type patterns having cellular voids 20a defined by the peripheral plastic filaments 20 may be formed in this fashion by varying the relative speed of motion of the fiber layer beneath the extrusion heads and the speed and direction of lateral motion of one or both of the extrusion heads relative to the fiber layer and each other. Reinforcing layers in prior seed mats generally have been independently formed prior to the formation of a seed mat and placed on the seed mat in their preformed condition during seed mat formation process.

The plastic from which the reinforcing mesh layer is formed must not only be of an extrudable nature at the time of placement, but also must set reasonably rapidly to a more solid condition that provides sufficient strength to fulfill its reinforcing purposes, and must also be biodegradable. The period required for biodegradation is important as the plastic must sustain its reinforcing nature for a period of time after placement and until seeds in the mat have germinated and are established in the earth's surface sufficiently to be positionally maintained therein and prevent erosion of that earth surface, but yet thereafter the materials must degrade rapidly so that the plastic mesh will not have to be physically removed to allow normal maintenance and use of the plant bed. Various biodegradable plastics have been developed and are available in present day commerce that provide such function, and such materials that have appropriate physical and chemical parameters may be used with our mat. Such materials degrade by reason of various factors of their environment, including not only age but also solubility, sensitivity to radiation, oxidation, microbal action, temperature and other common environmental factors.

Optional bottom mesh layer 10 may be provided below the bottom scrim layer 11. This additional bottom mesh layer, if present, further strengthens the seed mat structure, if the upper mesh layer 15 is not sufficient to provide required strength. Normally such additional reinforcement by a bottom mesh layer is not necessary and not particularly desirable, because such a layer may interfere with maintaining the bottom scrim layer 11 in immediate adjacency on the underlying earth, but such a layer may be required in unusual or difficult locations. If such an optional layer is used, it is of the same general nature and formed in place in the same fashion as the upper mesh layer 15 and provides the same interconnecting plastic filaments 20 forming a mesh.

There are instances of seed mat use where biodegradable plastic mesh is not desirable, especially where a plant bed requires no post-establishment maintenance, such as highway-side revegetation projects or the revegetation of steeply sloping, thinly stratified or unstable topography. In these situations, the continued existence of reinforcing mesh over a lengthy period after plant bed establishment may be quite beneficial to aid in stabilizing the earth and maintaining the integrity of a plant bed. In these instances, the reinforcing mesh may be advantageously formed from extrudable plastic materials that are not biodegradable and have a substantial useful life period after exposure to the environment of a seed bed. The formation of the mesh layers of our seed mat from such non-biodegradable extrudable plastic is within the ambit and spirit of our invention.

An optional additive 13 layer of beneficiating materials 21 may be added within the seed mat at any position above the bottom scrim and below the mat upper surface, but commonly if it is added it will be immediately above, below or within seed layer 12 and between bottom scrim 11 and fiber layer 14. Beneficiating materials 21 may comprise germination aids, fertilizers, pesticides, moisture retaining compounds and the like that enhance the environment for seed germination or seedling growth. These materials commonly are in a particulate form and are placed by scattering over the surface of the seed layer 12 to be supported by fiber layer 14. It is possible that if any or all of the beneficiating materials are soluble they may be placed by spraying a solution of the materials on the seed layer 12 and supporting fiber layer 14 with subsequent removal of the fluidic carrier by drying. It may be advantageous to place such materials by spraying because the materials so placed tend to be more evenly distributed and do not migrate from the position of their original placement to disrupt their homogeneous distribution, hut spray placement generally slows the manufacturing process and may disrupt creation of other portions of the mat, especially the scrim layers. Spray type placement of beneficiating materials, however, is within the ambit and scope of our invention.

It is possible that particulate beneficiating materials may be distributed in fiber mat 14, as has been done in seed mats in the past, but this type of placement tends to be haphazard and the materials tend to migrate, especially vertically or through the thickness of the mat, so that after mat processing and placement the beneficiating materials may not be homogeneously distributed.

Optional upper scrim layer 16 may be placed on the upper portion of the mat, either on the upper surface of fiber layer 14 and below mesh layer 15 or above the upper mesh layer. If such an upper scrim layer is used, it is formed of cellulosic fiber tissue 20 in the same fashion as the bottom scrim layer 11. Such an upper scrim layer provides a consolidating cover for the upper exposed surface of fiber layer 14 and may contain additives including adhesives and sealants that effect the functioning of the mat, especially to present somewhat of a barrier to passage of water or its vapors through the upper scrim layer to better and more efficiently maintain a moist environment in the seed mat for longer periods of time. Such an upper scrim layer also tends to prevent any particulate materials in the seed layer 12 or additive layer 13 from passing through fiber mat 14 and outwardly through the outer surface of the fiber mat during handling and placement of the mat.

Formation Process

Our seed mat may be formed as a strip of any desired width and length by a continuous process.

The seed mat is formed on a continuous conveyor 22 that moves the mat sequentially between a plurality of processing stations where the various formation processes are carried out. The conveyor surface supporting the mat must be of a nature to provide appropriate support for the mat at all processing stages, but yet must be permeable by air to allow consolidation of scrim layers by application of vacuum on the mat under surface and generally through the conveyor. The material of preference for the conveyor belt is a wire screen 23 having sufficient flexibility to allow motion about a closed course defined by ancillary conveyor support structures to allow continuous operation of the formation process.

The first portion of our seed mat formation process is diagrammatically illustrated in FIG. 2 where it is seen that fiber layer 14 is formed on conveyor screen 23 by depositing fiber 19, including plastic fiber if used, on the screen from fiber hopper 24. This fiber layer is deposited by known methods to create fiber entanglement to some degree in both horizontal and vertical directions. The thickness of the fiber layer is regulated to provide a uniformly desired thickness and the desired water retention. If thermal plastic fiber is used the fiber layer is passed adjacent to heating structure 39 which raises the temperature of the mat sufficiently to plasticize or partially liquefy the plastic fibers to cause the plastic fibers to adhere to adjacent cellulosic fibers to form a somewhat interconnected network of fiber. Heater 39 may be of various known types so long as it uniformly raises the temperature of the fiber mat sufficiently to accomplish its purposes. The amount of fusion of plastic fibers may be regulated by temperature and time of application of heat to regulate the amount of fiber interconnection.

The fiber layer is further consolidated and somewhat felted by pressure generated thereon by passage between vertically opposed consolidation rollers 25 on both sides of the fiber layer. If it be desired that the fiber layer be consolidated by needling, that step is carried out before or after consolidation by compression rollers 25 by known needling apparatus (not shown). Biologically benefiting materials or adhesives may be added to the fiber layer in particulate or fluidic form, preferably during or immediately after deposition of the fiber layer on the conveyor screen and normally before consolidation between compression rollers 25.

The fiber layer 14 then is conveyed beneath extruder structure and upper mesh layer 15 is extruded onto the then upper surface of the fiber. This extrusion is accomplished by apparatus previously described comprising at least one extrusion head, preferably two spacedly adjacent extrusion heads 26, 27 and possibly three or more heads, any or all of which may be movable relative to the seed mat passing therebeneath and relative to each other to create various extrusion patterns as previously described.

Various extrudable plastic materials are operative with the instant mat and its manufacture, but the material and extrusion processes should be such that the extruded material creates some adhesion to the mat fiber to aid formation of a unitary mat structure and provide additional strength and cohesiveness to the mat. For continuous processing, it is also desirable that the extruded plastic set or polymerize to a reasonably rigid state within a short period of time after its deposition. This setting or polymerization may be aided or enhanced by auxiliary structure and procedures (not shown) as known for such purposes in the plastic extrusion arts. The size of extruded strands, their patternization on the mat and their interconnection may be adjusted to aid in providing a mesh layer 15 of appropriate strength, aside from the strength resulting from the nature of the material from which the mesh is formed.

Optional scrim layer 16, if used, is placed on the upper surface of upper mesh layer 15 and exposed fiber layer 14 therebeneath. The scrim layer is placed from roll 28 on top of the mesh layer. The mat then is moved beneath spray head 29 where the scrim tissue is wetted with fluid that may contain adhesives, sealants and other additives to make it pliant. The mat then is moved over vacuum source 30, in the instance illustrated located beneath the conveyor screen 23, to consolidate the wetted and pliable tissue layer into immediate adjacency with the mat surfaces therebeneath. The mat then is moved through dryer 31, generally comprising a hot air convection tunnel, to remove most of the moisture from the scrim layer to further consolidate it onto the supporting mat surface therebelow and make it more durable and less pliable than in its wetted condition.

To continue the formation process, the then partially formed mat is turned over on conveyor 22 by known turning structure 32 so that the former lower fiber layer surface 19*a* is uppermost. The turning structure 32 normally provides a spiral raised bridge above the conveyor moving therebeneath to accomplish its result.

Figures 2A, 2B:
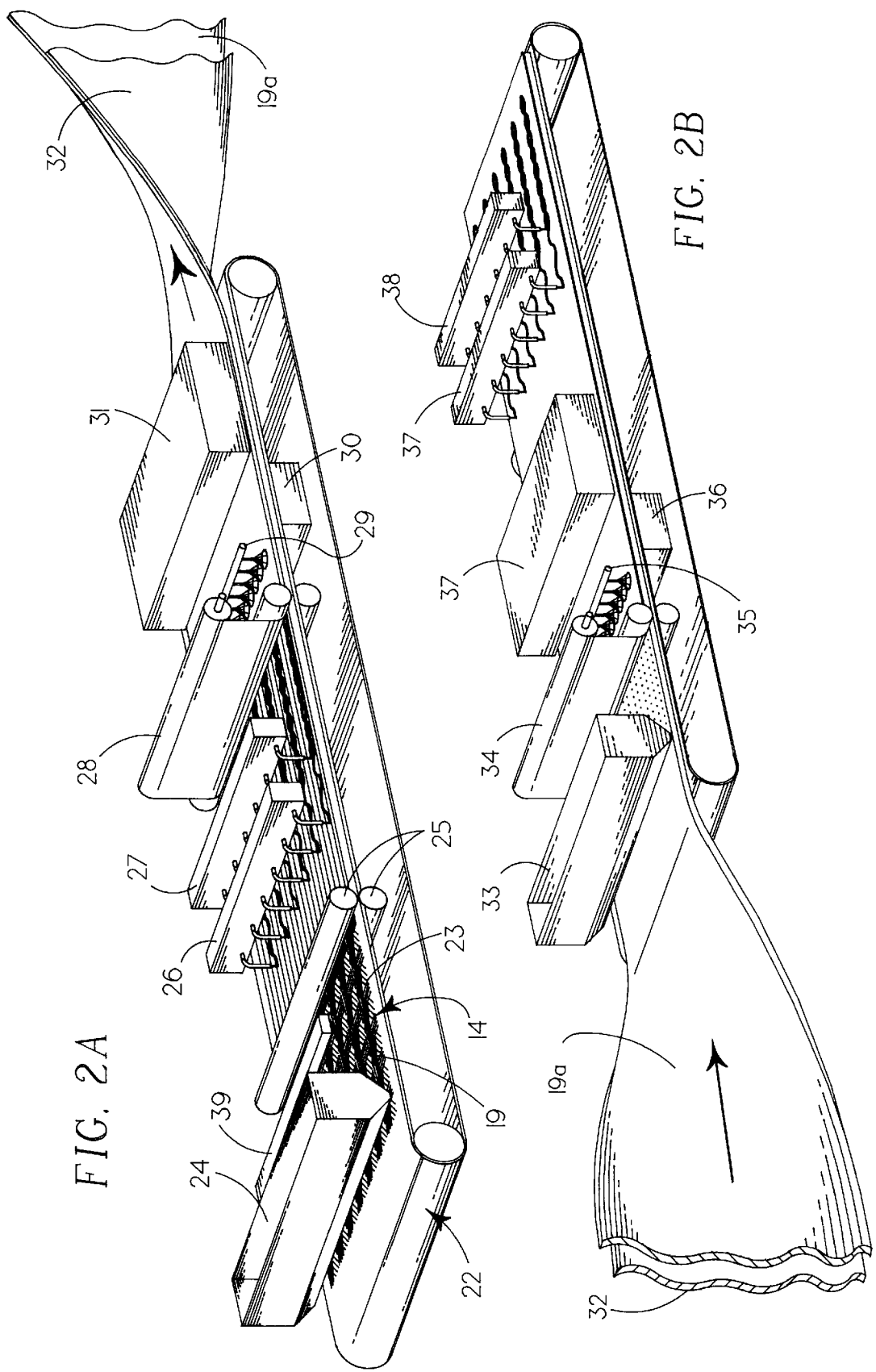
FIGS. 2A and 2B are sequential portions of a single continuous diagrammatic flow sheet type illustration showing the process by which our seed mat is formed.

As seen in continuation FIG. 2B, the conveyor 22 then moves the mat structure beneath one or more seed distribution hoppers 33 which distribute a layer of seed 18 on the upper surface 19*a* of the fiber layer 14 therebeneath. Such hoppers 33 are known and need not be especially adopted to our process, so long as they provide a desired seed distribution. The seeds distributed may be of any desired type and may constitute mixtures of various types. Beneficiating materials 21 desired in the mat at the position of the seed layer, may be distributed from the seed distribution hopper with the seed or, if desired, one or more separate additive hoppers (not shown) either adjacently upstream or downstream of the seed distribution hopper 33, may be used to place such materials on the then upper surface of the fiber mat. The density of seeds and beneficiating materials in the mat and any special placement of either seeds or additive materials in particular areas of the mat is accomplished by methods heretofore known for such purposes.

The seed mat then with the seed layer uppermost is moved by conveyor 22 beneath bottom scrim roll 34 and dry sheet scrim material carried on that roll is unrolled over the seed layer 12 and supporting surface of fiber layer 14 now therebeneath to provide lower scrim layer 17.

The mat then moves beneath scrim spray structure 35 where it is sprayed with fluid to wet it and make it more pliable. The wetting is preferably accomplished by an aqueous solution that may contain additives desired in the mat structure, especially such as adhesives, stiffeners and sealants that provide the completed scrim layer with particularly desired physical characteristics. The mat then is moved over vacuum structure 36, that is beneath the conveyor screen 23 in the instance illustrated, to apply vacuum on the wetted pliable scrim layer from beneath the mat to consolidate the scrim layer on the seed layer and fiber layer therebeneath. The vacuum incorporation provides a more cohesive interface with the mat and aids the functioning of any adhesives that may have been used in the wetting fluid. The wetted consolidated scrim layer then is moved through drying structure 37 which removes a substantial portion of the moisture in the lower scrim layer 17 to dry and further consolidate that layer upon the mat structure.

An optional bottom mesh layer 10 may be added to the mat on the bottom scrim layer 11 which is now uppermost on conveyor 22. If such a bottom mesh layer is desired to provide a stronger, more durable mat, the conveyor moves the seed blanket beneath spaced, laterally extending extrusion heads 37 and 38 for deposition of the mesh layer 10 in desired patternation. The operation of these extruder heads 37, 38 is substantially the same as the operation of extrusion heads 26 and 27 previously described though the material extruded may be different if desired.

The seed mat is now completed and removed for storage and use. The mat surface that is uppermost at completion of the manufacturing process is the surface that ultimately will be the lower surface when the mat is placed on the earth for use. The mat commonly after completion is rolled in discrete lengths for storage, transport and merchandising, and this rolling may be accomplished with the bottom scrim layer inside or outside a roll as desired for convenience of placement. Most commonly it is easier to place a roll of seed mat if the lower scrim layer is outermost in the roll. Better protection for the seed layer may be provided, however, if the bottom scrim layer and adjacent seed layer are innermost in a roll.

It is to be particularly noted from the foregoing formation process for our seed mat that there need be no needling of the mat at any time to cause it to maintain its structure, but if it is to be needled, the needling would occur before placement of any seeds on the fiber layer so that needling would not deleteriously affect seeds.

It is further to be noted that the top mesh layer and optional bottom mesh layer, if used, may assume a wide range of configurations and may be formed of various materials to provide a broad range of physical and chemical characteristics at a substantially lower cost than by embodying ready-made, preformed meshes in a seed blanket, as has been done in the past. This variation in mesh layers allows formation of mats having mesh with biodegradability extending from very shortly after placement to long periods thereafter and strength ranges varying in their lower reaches from being too weak and in their reaches too strong to be of any economic viability, while yet maintaining a reasonable cost for the seed mat that is lower or not appreciably higher than the cost of heretofore existing seed blankets not having the benefits of the instant mat.

The foregoing description of our invention is necessarily of a detailed nature so that a specific embodiment of it might be set forth as required, but it is to be understood that various modifications of detail, rearrangement and multiplication of elements might be resorted to without departing from its spirit, essence or scope.

Having thusly described our invention, what we desire to protect by Letters Patent, and what we claim is:

1. A mat, for placement and positional maintenance of seeds on the earth that aids seed germination and seedling establishment, having an upper and a lower surface and comprising in combination:

a lower scrim layer of thin biodegradable cellulosic fiber overlain by a seed layer of spacedly arrayed seeds to be established overlain by a fiber layer of compacted, water absorbative vegetative fiber overlain by an upper reinforcing mesh layer formed of biodegradable polymeric material extruded in place on the fiber layer.

2. The mat of claim 1 further characterized by:

the lower scrim layer consolidated on the adjacent seed layer and fiber layer by wetting to make the scrim layer pliable, moving the scrim layer into immediate adjacency with the seed layer and fiber layer by applying vacuum to the side of the fiber layer distal from the scrim layer and subsequently drying the scrim layer.

3. The seed mat of claim 1 having a lower plastic mesh layer formed of biodegradable polymeric material extruded in place on the lower surface of the lower scrim layer.

4. The seed mat of claim 1 having a thin upper scrim layer of biodegradable cellulosic fiber overlaying the upper mesh layer and consolidated on the adjacent upper mesh, seed layer and fiber layer by being wetted to make the scrim layer pliable, moved into immediate adjacency with the adjacent upper mesh seed and fiber layers by applying vacuum to the side of the fiber layer distal from the scrim layer and subsequently dried.

5. The seed mat of claim 1 having an upper scrim layer of thin biodegradable cellulosic fiber covering the fiber layer beneath the overlying upper mesh layer and consolidated on the adjacent seed layer and fiber layer by being wetted to make the scrim layer pliable, moved into immediate adjacency with the adjacent seed and fiber layers by applying vacuum to the side of the fiber layer distal from the scrim layer and subsequently dried.

6. The seed mat of claim 1 having biologically beneficiating materials to aid germination of vegetative seeds and establishment of seedlings generated by the seeds carried in the seed mat above the lower scrim layer and below the upper surface of the fiber layer.

7. The seed mat of claim 1 having elongate strands of thermal plastic material intermixed with and adhered to the vegetative fibers to interconnect the vegetative fibers to form a more coherent fiber layer.

8. A process for the formation of the seed mat of claim 1, comprising the steps of:

creating a fiber layer of water absorbent vegetative fiber on a supporting surface;

creating a plastic mesh layer on the upper surface of the fiber layer by extruding interconnecting strands of settable plastic on the fiber layer;

turning the mat upside down on the supporting surface;

creating a seed layer on the then upper surface of the fiber mat layer;

creating a scrim layer by placing dry biodegradable cellulosic tissue over the seed layer and underlying fiber layer, wetting the tissue to make it more pliable, consolidating the wetted tissue on the underlying seed and fiber layers by application of vacuum from the side of the fiber layer distal from the scrim layer and drying the scrim layer.

9. The process of claim 8 further including the step of:
creating an upper scrim layer on the upper surface of the fiber layer before extrusion of the plastic mesh layer on the fiber layer, by placing dry biodegradable cellulosic tissue over the fiber layer, wetting the tissue to make it more pliable, consolidating the wetted tissue on the underlying fiber layer by application of vacuum from the side of the fiber layer distal from the scrim layer and drying the scrim layer.

10. The process of claim 8 further including the step of:
creating a bottom mesh layer on the lower surface of the lower scrim layer by extruding interconnecting strands of settable plastic on the lower scrim layer when when the layer is uppermost.

11. The process of claim 8 further including the steps of:
mixing thermal plastic fiber with the water absorbative vegetative fiber and heating the admixed fiber layer to bond the thermal plastic fiber with adjacent vegetative fiber.

* * * * *